Aug. 22, 1961   S. WISSMAN   2,997,211
DISPENSING CONTAINER
Filed Aug. 25, 1958

INVENTOR
Seth Wissman

BY Cecil L. Wood

ATTORNEY

United States Patent Office 2,997,211
Patented Aug. 22, 1961

2,997,211
DISPENSING CONTAINER
Seth Wissman, Dallas, Tex., assignor to Pest-Guard Products, Inc., Dallas, Tex., a corporation of Texas
Filed Aug. 25, 1958, Ser. No. 756,796
1 Claim. (Cl. 222—142.9)

This invention relates to a dispensing container, and it concerns more particularly a disposable container having a plurality of compartments arranged therein, and means for selectively dispensing the contents of the several compartments.

An object of the invention is to provide a disposable container of the type described which advantageously may be made of paper material, for use in selectively dispensing beverage concentrates of different flavors in dry, finely divided form.

Another object of the invention is to provide a disposable paper container comprising a cylindrical casing, closed at its ends, a plurality of compartments in the casing each defined by a compressed cylinder, elliptical in transverse section, closed at its ends by the ends of the casing, the several compartments being arranged eccentrically relative to the casing, one end of the casing having openings therein corresponding to the several compartments, and a cylindrical closure enclosing the end of the casing having the openings therein, the closure being rotatably connected to the casing and having an opening therein capable of being selectively aligned with one of the openings of the casing.

The invention will be readily understood by referring to the following description and the accompanying drawing, in which.

Figure 1:
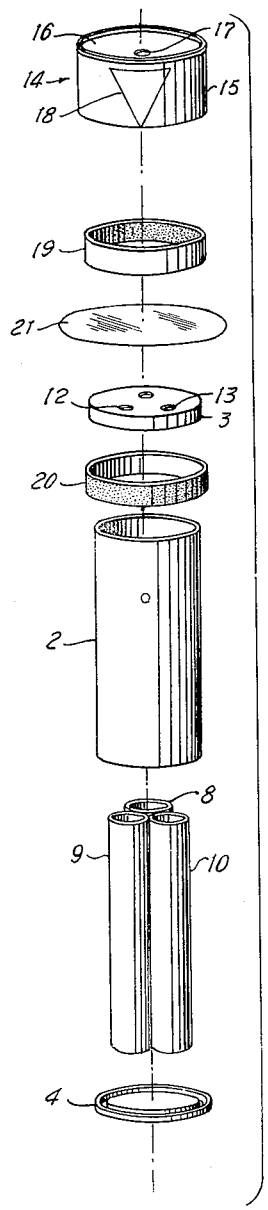
FIGURE 1 is an exploded perspective view of a container embodying the invention.
Figure 2:
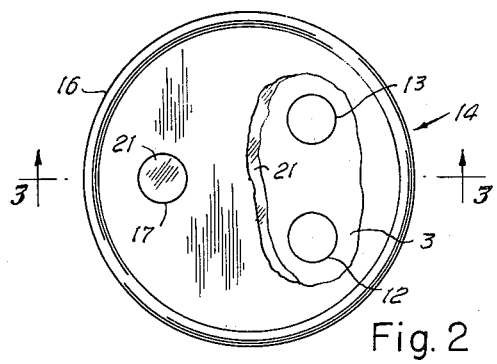
FIGURE 2 is a top plan view, partly broken away.
Figure 3:
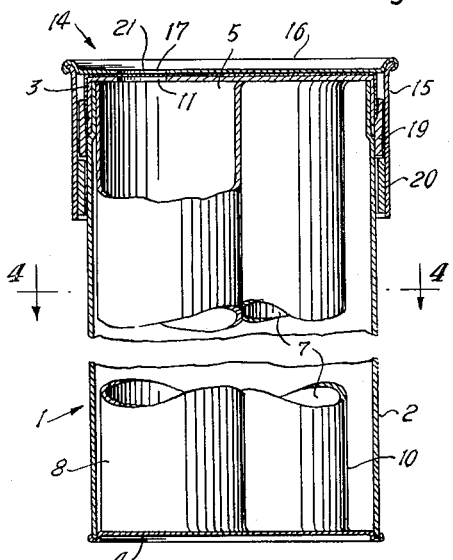
FIGURE 3 is a sectional elevational view taken on a median line.
Figure 4:
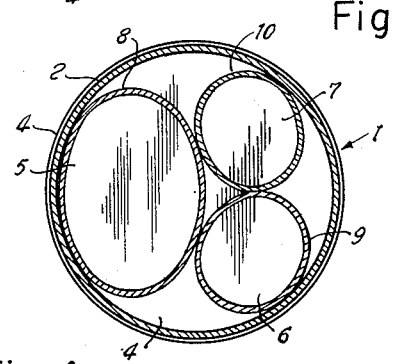
FIGURE 4 is a sectional plan view taken on the lines 4—4 of FIGURE 3.

Referring to the drawing, the container of the invention includes a cylindrical casing, which is designated generally by the numeral 1. The casing 1 advantageously may be formed of coated or uncoated paper, and has a cylindrical side wall 2 which is closed at its ends as hereinafter described.

A flanged cover 3 frictionally engages the upper end of the side wall 2, and a bottom disc 4 has a rolled peripheral edge whereby it is secured to the lower end of the side wall 2.

A plurality of three compartments in the casing 1, numbered 5, 6 and 7, are defined by compressed cylinders 8, 9 and 10, respectively. The compressed cylinders 8, 9 and 10 are elliptical in transverse section, and are closed at their ends by the flanged cover 3 and the bottom disc 4, which comprise the ends of the casing 1. The several compartments 5, 6 and 7 are arranged eccentrically relative to the casing 1.

The flanged cover 3 has circumferentially spaced discharge openings 11, 12 and 13 therein corresponding to the compartments 5, 6 and 7, respectively.

A cylindrical closure 14 encloses the upper end of the casing 1, and is rotatably connected thereto. The closure 14 has a cylindrical side wall 15 and a top disc 16 having a rolled peripheral edge whereby it is attached to the side wall 15. A discharge opening 17, which is formed in the top disc 16, is capable of being selectively aligned with one of the discharge openings 11, 12 and 13 upon rotation of the closure 14 relative to the casing 1.

A pointer 18, which is formed on the side wall 15, is aligned circumferentially with the discharge opening 17 and is capable of being aligned with indicia (not shown) on the side wall 2 whereby the discharge opening 17 may be selectively aligned with one of the discharge openings 11, 12, and 13 corresponding to one of the compartments 5, 6 and 7 containing a beverage concentrate of the desired flavor.

The cylindrical closure 14 is rotatably connected to the casing 1 by an annular strip 19 and may be coated to provide smooth rotation, which is bonded partly to the peripheral surface of the flanged cover 3 and partly to the peripheral surface of the side wall 2, and an annular strip 20, which is positioned below the annular strip 19 and is bonded to the inner surface of the side wall 15. The annular strip 19 also secures the flanged cover 3 to the side wall 2.

The sealing disc 21, which is capable of being punctured to expose the discharge openings 11, 12, 13 and 17, is inserted, respectively, between the cylindrical closure 14 and the flanged cover 3, and between the flanged cover 3 and the upper ends of the side wall 2 and the compressed cylinders 8, 9 and 10.

The invention may be modified in various ways without departing from the spirit and scope thereof.

What is claimed is:

A disposable dispensing container, cylindrical in form and having fixed top and bottom closures, a plurality of openings in said top closure, a plurality of compressed cylinders, eliptical in transverse section, axially arranged in said container, each aligned with one of said openings, a rotative cap for said container enclosing said top closure, a depending flange on said cap having an internal annular strip secured about its lower inner surface defining an annular shoulder spaced above the lower rim of said flange, a second annular strip secured near the top of said container circumferentially and externally thereof above said annular shoulder in said depending flange, whereby said cap is rotatively secured to said container, and an opening in said cap adapted to be selectively aligned with one of said openings in said fixed closure and one of said cylinders.

References Cited in the file of this patent

UNITED STATES PATENTS

| | | |
|---|---|---|
| 1,349,716 | Elliot | Aug. 17, 1920 |
| 1,954,719 | Vendel | Apr. 10, 1934 |
| 2,655,288 | Caretto | Oct. 13, 1953 |
| 2,890,816 | Horland | June 16, 1959 |

FOREIGN PATENTS

| | | |
|---|---|---|
| 79,958 | Sweden | Mar. 27, 1934 |